United States Patent
Ittah et al.

(10) Patent No.: US 8,301,694 B2
(45) Date of Patent: *Oct. 30, 2012

(54) HOST DEVICE AND METHOD FOR ACCESSING A VIRTUAL FILE IN A STORAGE DEVICE BY BYPASSING A CACHE IN THE HOST DEVICE

(75) Inventors: Eyal Ittah, Alfe-Menashe (IL); Judah Gamliel Hahn, Ofra (IL); Yehuda Drori, Modiin (IL); Joseph Meza, Aliso Viejo, CA (US); In-Soo Yoon, Seoul (KR)

(73) Assignee: SanDisk IL Ltd., Kfar Saba (IL)

( * ) Notice: Subject to any disclaimer, the term of this patent is extended or adjusted under 35 U.S.C. 154(b) by 213 days.

This patent is subject to a terminal disclaimer.

(21) Appl. No.: 12/797,513

(22) Filed: Jun. 9, 2010

(65) Prior Publication Data

US 2011/0289137 A1     Nov. 24, 2011

Related U.S. Application Data

(60) Provisional application No. 61/346,796, filed on May 20, 2010.

(51) Int. Cl.
*G06F 15/16* (2006.01)
*G06F 12/08* (2006.01)
*G06F 12/00* (2006.01)

(52) U.S. Cl. ........ 709/203; 709/212; 709/213; 709/219; 711/138; 713/193; 726/4

(58) Field of Classification Search .................. 709/213, 709/220, 206, 203
See application file for complete search history.

(56) References Cited

U.S. PATENT DOCUMENTS 6,466,944 B1   10/2002   Stokes
(Continued)

FOREIGN PATENT DOCUMENTS

WO   WO 2008/082949   7/2008
(Continued)

OTHER PUBLICATIONS

"Storage Device and Method for Using a Virtual File in a Public Memory Area to Access a Plurality of Protected Files in a Private Memory Area," U.S. Appl. No. 12/634,470, filed Dec. 9, 2009, Inventors: Ehud Cohen, Eyal Ittah, Lola Grin, Uri Peltz, Irit Maor, Yonatan Halevi, and Avraham Schmuel.

(Continued)

*Primary Examiner* — Jude Jean Gilles
(74) *Attorney, Agent, or Firm* — Brinks Hofer Gilson & Lione

(57) ABSTRACT

A host device is provided comprising an interface configured to communicate with a storage device having a public memory area and a private memory area, wherein the public memory area stores a virtual file that is associated with content stored in the private memory area. The host device also comprises a cache, a host application, and a server. The server is configured to receive a request for the virtual file from the host application, send a request to the storage device for the virtual file, receive the content associated with the virtual file from the private memory area of the storage device, wherein the content is received by bypassing the cache, generate a response to the request from the host application, the response including the content, and send the response to the host application. In one embodiment, the server is a hypertext transfer protocol (HTTP) server.

20 Claims, 6 Drawing Sheets

U.S. PATENT DOCUMENTS

| | | | |
|---|---|---|---|
| 6,574,618 B2 | 6/2003 | Eylon et al. | |
| 6,868,495 B1 | 3/2005 | Glover | |
| 6,941,456 B2 | 9/2005 | Wilson | |
| 6,976,165 B1 | 12/2005 | Carpentier et al. | |
| 7,328,437 B2 * | 2/2008 | Donovan et al. | 718/1 |
| 7,454,542 B2 | 11/2008 | Illowsky et al. | |
| 7,899,793 B2 | 3/2011 | Mimatsu | |
| 7,917,628 B2 | 3/2011 | Hesselink et al. | |
| 8,090,690 B2 | 1/2012 | Zamkoff et al. | |
| 8,166,265 B1 * | 4/2012 | Feathergill | 711/162 |
| 2002/0099798 A1 | 7/2002 | Fedorovsky et al. | |
| 2002/0157010 A1 | 10/2002 | Dayan et al. | |
| 2004/0230972 A1 * | 11/2004 | Donovan et al. | 718/1 |
| 2005/0281404 A1 | 12/2005 | Yu | |
| 2006/0129496 A1 | 6/2006 | Chow et al. | |
| 2006/0161725 A1 | 7/2006 | Lee et al. | |
| 2006/0167985 A1 | 7/2006 | Albanese et al. | |
| 2007/0143555 A1 | 6/2007 | Nemiroff et al. | |
| 2007/0220021 A1 | 9/2007 | Kato et al. | |
| 2008/0133564 A1 | 6/2008 | Gandolph et al. | |
| 2008/0177994 A1 | 7/2008 | Mayer | |
| 2008/0195797 A1 | 8/2008 | Sherman et al. | |
| 2008/0244713 A1 | 10/2008 | Jogand-Coulomb | |
| 2008/0276058 A1 | 11/2008 | Mosek | |
| 2009/0119782 A1 | 5/2009 | Mardiks | |
| 2009/0171679 A1 | 7/2009 | Salgado et al. | |
| 2009/0171715 A1 | 7/2009 | Conley et al. | |
| 2010/0312823 A1 * | 12/2010 | Titus | 709/203 |
| 2011/0138487 A1 * | 6/2011 | Cohen et al. | 726/32 |
| 2011/0289178 A1 * | 11/2011 | Ittah et al. | 709/213 |

FOREIGN PATENT DOCUMENTS

| | | |
|---|---|---|
| WO | WO 2009/085122 | 7/2008 |
| WO | WO2008/135969 | 11/2008 |

OTHER PUBLICATIONS

International Search Report and Written Opinion for PCT/US2011/033609, dated Oct. 11, 2011, 9 pages.

Arcangeli, A., "O_DIRECT", *UKUUG Manchester*, Jun. 29-Jul. 1, 2001, pp. 1-6, printed on Apr. 15, 2010 from http://ukuug.org/events/linux2001/papers/html/AArcangeli-o_direct.html.

Fielding, et al., "Hypertext Transfer Protocol-HTTP/1.1", *RFC 2616*, pp. 1-5, printed on Apr. 15, 2010 from http://www.w3.org/Protocols/rfc2616/rfc2616-sec9.html.

"Linux: Accessing Files With O_DIRECT", *Kernel Trap*, Jan. 11, 2007, pp. 1-19, printed on Apr. 15, 2010 fromm http://kerneltrap.org/node/7563.

"Linux: O-STREAMING-Optimal Streaming I/O", *Kernel Trap*, Oct. 12, 2002, pp. 1-10, printed on Apr. 15, 2010 from http://kerneltrap.org/node/460.

International Search Report and Written Opinion for PCT/US2010/057438, dated Mar. 22, 2011, 9 pages.

Office Action for U.S. Appl. No. 12/634,470, dated Apr. 24, 2012, 13 pages.

Office Action for U.S. Appl. No. 12/826,626, dated Mar. 29, 2012, 6 pages.

Notice of Allowance for U.S. Appl. No. 12/826,626, 7 pages, Aug. 21, 2012.

* cited by examiner

HOST DEVICE AND METHOD FOR ACCESSING A VIRTUAL FILE IN A STORAGE DEVICE BY BYPASSING A CACHE IN THE HOST DEVICE

CROSS-REFERENCE TO RELATED APPLICATION

This application claims the benefit of U.S. Provisional Application No. 61/346,796, filed May 20, 2010, which is hereby incorporated by reference.

BACKGROUND

Storage devices, such as memory cards, are often used to store content, such as digital audio (e.g., music) and/or video (e.g., movies) files. To protect content from unauthorized access, the content can be stored in a private memory area in the storage device, which is accessible only by authenticated hosts. In general, a host presents its credentials to the storage device for authentication. If the host is authenticated, the storage device allows the host to access the content stored in the private memory area. While this security system prevents unauthorized hosts from accessing the content stored in the private memory area, a problem can occur if an authenticated host has a virus or other malicious software on it. In that situation, once the authenticated host is allowed access to the private memory area, malicious software on the host can take advantage of that access to perform unauthorized acts on the data stored in the private memory area.

SUMMARY

Embodiments of the present invention are defined by the claims, and nothing in this section should be taken as a limitation on those claims.

By way of example, the embodiments described below generally relate to a host device and method for accessing a virtual file in a storage device by bypassing a cache in the host device. In one embodiment, a host device is provided comprising an interface configured to communicate with a storage device having a public memory area and a private memory area, wherein the public memory area stores a virtual file that is associated with content stored in the private memory area. The host device also comprises a cache, a host application, and a server. The server is configured to receive a request for the virtual file from the host application, send a request to the storage device for the virtual file, receive the content associated with the virtual file from the private memory area of the storage device, wherein the content is received by bypassing the cache, generate a response to the request from the host application, the response including the content, and send the response to the host application. In one embodiment, the server is a hypertext transfer protocol (HTTP) server.

Other embodiments are provided, and each of the embodiments can be used alone or together in combination. Various embodiments will now be described with reference to the attached drawings.

DETAILED DESCRIPTION OF THE PRESENTLY PREFERRED EMBODIMENTS

Introduction

The following embodiments generally relate to a virtual file in a public memory area of a storage device that provides access a plurality of protected files in a private memory area of the storage device and, more particularly, to a host device and method for accessing a virtual file by bypassing a cache in the host device. In general, a virtual file stored in a public memory area of a storage device acts as a gateway to a plurality of protected files in a private memory area of the storage device. When the storage device detects that a host device is attempting to access the virtual file, the storage device determines which of the plurality of protected files, if any, should be provided to the host device. In this way, subsequent attempts to read the same virtual file can result in different content being returned to the host device. A problem can occur, however, when the host device uses a cache to improve performance by storing previously-retrieved data. Specifically, when subsequent requests are made for the virtual file, the host device will simply access its cache instead of accessing the storage device, as the host device thinks of the virtual file as a static file. So, if the virtual file were used to access multiple songs stored in the private memory area of the storage device, the host device would play the same song each time the virtual file is read, instead of playing different songs as desired.

Before turning to embodiments that address this problem, a general discussion is provided of exemplary virtual file embodiments and of exemplary storage devices.

Exemplary Virtual File Embodiments

Figure 1:
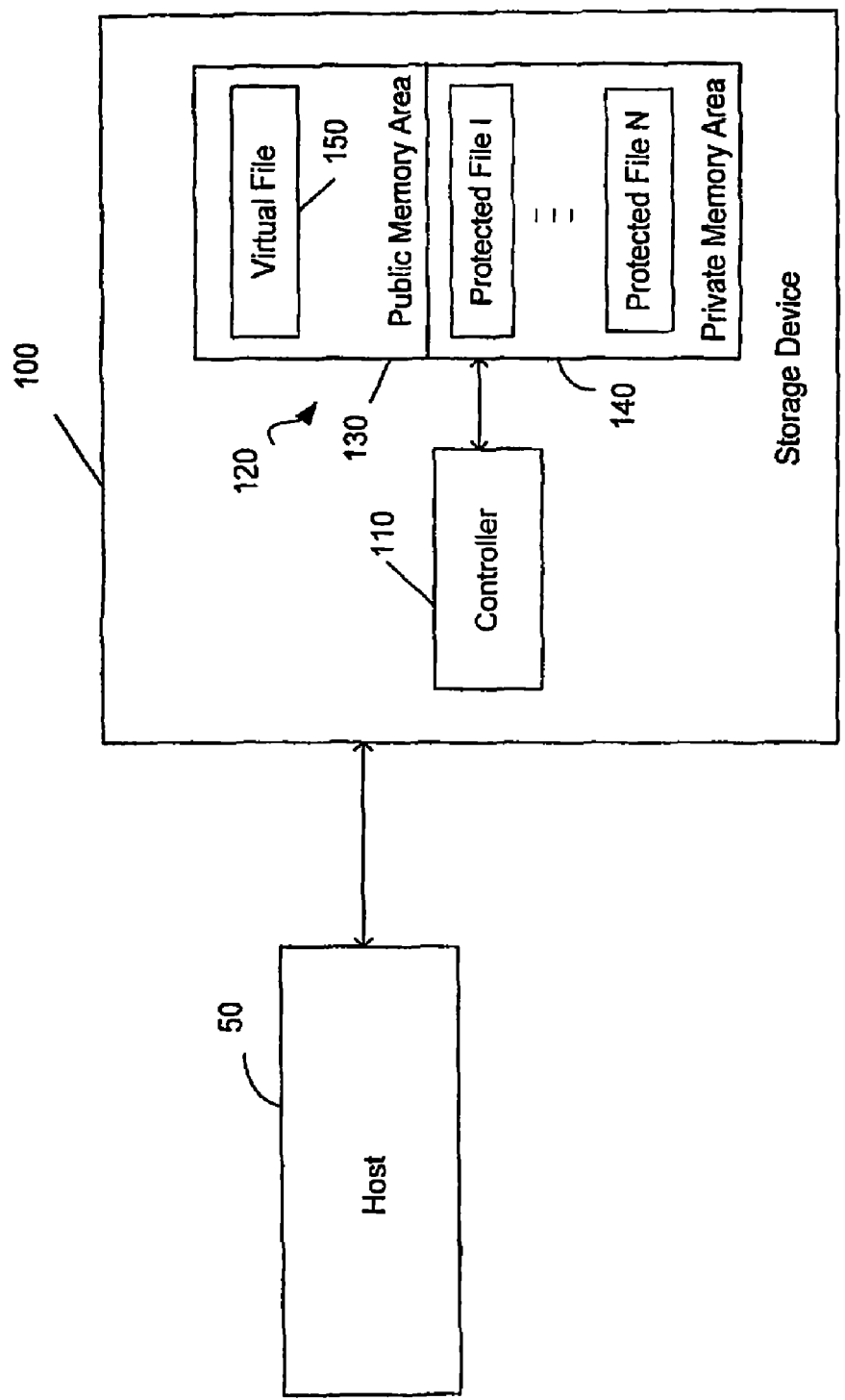
FIG. 1 is a block diagram of a host and a storage device of an embodiment.

Turning now to the drawings, FIG. 1 is a block diagram of a host (or "host device") 50 in communication with a storage device 100 of an embodiment. As used herein, the phrase "in communication with" means directly in communication with or indirectly in communication with through one or more components, which may or may not be shown or described herein. The host 50 can take any suitable form, such as, but not limited to, a dedicated content player, a mobile phone, a personal computer (PC), a game device, a personal digital assistant (PDA), a kiosk, and a TV system. The storage device 100 can also take any suitable form, such as, but not limited to, a handheld, removable memory card (e.g., a flash storage card), a universal serial bus (USB) device, and a solid-state drive. Preferably, the storage device 100 is removably connected to the host 50, so a user can use the storage device 100 with a variety of hosts.

As shown in FIG. 1, the storage device 100 comprises a controller 110 and a memory 120. The controller 110 can be implemented in any suitable manner. For example, the controller 110 can take the form of a microprocessor or processor and a computer-readable medium that stores computer-readable program code (e.g., software or firmware) executable by the (micro)processor, logic gates, switches, an application specific integrated circuit (ASIC), a programmable logic controller, and an embedded microcontroller, for example. Examples of controllers include, but are not limited to, the following microcontrollers: ARC 625D, Atmel AT91SAM, Microchip PIC18F26K20, and Silicon Labs C8051F320. Examples of various components that can be used in a controller are described in the embodiments discussed below and are shown in the associated drawings. The controller 110 can also be implemented as part of the memory control logic.

As also shown in FIG. 1, the storage device 100 comprises a memory 120, which can take any suitable form. In one embodiment, the memory 120 takes the form of a solid-state (e.g., flash) memory and can be one-time programmable, few-time programmable, or many-time programmable. However, other forms of memory, such as optical memory and magnetic memory, can be used. Although shown as single components in FIG. 1, the controller 110 and/or memory 120 can be implemented with several components. In FIG. 1, the memory 120 comprises a public memory area 130 and a private memory area 140. In this embodiment, the public and private memory areas 130, 140 are different partitions of a single memory device; however, in other embodiments, the public and private memory areas 130, 140 are different memory devices. The public memory area 130 is generally accessible without restriction, while the private memory area 140 can only be accessed by authorized entities and is typically invisible to a host (e.g., a hidden partition). As such, the private memory area 140 can be used to store a plurality of content files (here, files 1-N) that should only be accessed by authorized entities. A "content file" can take any suitable form, such as, but not limited to, digital video (with or without accompanying audio) (e.g., a movie, an episode of a TV show, a news program, etc.), audio (e.g., a song, a podcast, one or a series of sounds, an audio book, etc.), still or moving images (e.g., a photograph, a computer-generated display, etc.), text (with or without graphics) (e.g., an article, a text file, etc.), a video game or other software, and a hybrid multi-media presentation of two or more of these forms. The terms "content," "content file," and "file" will be used interchangeably herein, and a file stored in the private memory area 140 will be referred to as a "protected file."

In this embodiment, the public memory area 130 contains a virtual file 150. The virtual file 150 is "virtual" in the sense that it exists as allocated logical block addresses in the file allocation table (FAT) for the public memory area 130 but it does not contain any data and is not actually accessible. There may not even be any physical storage locations allocated in the public memory area 130 for the virtual file 150 (although, as discussed below, in some embodiments, a relatively small amount of physical storage locations (e.g., 15 MB) may be allocated in the public memory area 130 for the virtual file 150). However, since the virtual file 150 has logical block addresses allocated to it the FAT table in the public memory area 130, the virtual file 150 will appear as a regular file to the host 50.

In this embodiment, the virtual file 150 serves as a gateway to the plurality of protected files 1-N in the private memory area 140. That is, when the controller 110 recognizes that an attempt is being made to access the virtual file 150 (e.g., from logical block addresses specified in a read command), the controller 110 will take a special action instead of providing the host 50 with access to the virtual file 150 itself. For example, when the controller 110 receives a request from the host 50 for access to the virtual file 150, the controller 110 can select one of the plurality of protected files 1-N stored in the private memory area 140 and respond to the request by providing the host 50 with access to the selected protected file. When the same virtual file 150 is later accessed, the controller 110 can select and provide access to a different one of the plurality of protected files 1-N. For example, if the virtual file 150 is named "audio.MP3" and is associated with a playlist of 20 songs stored in the private memory area 140, every time the host 50 requests access to "audio.MP3," the controller 110 can select and provide access to another song on the playlist.

Figure 2:
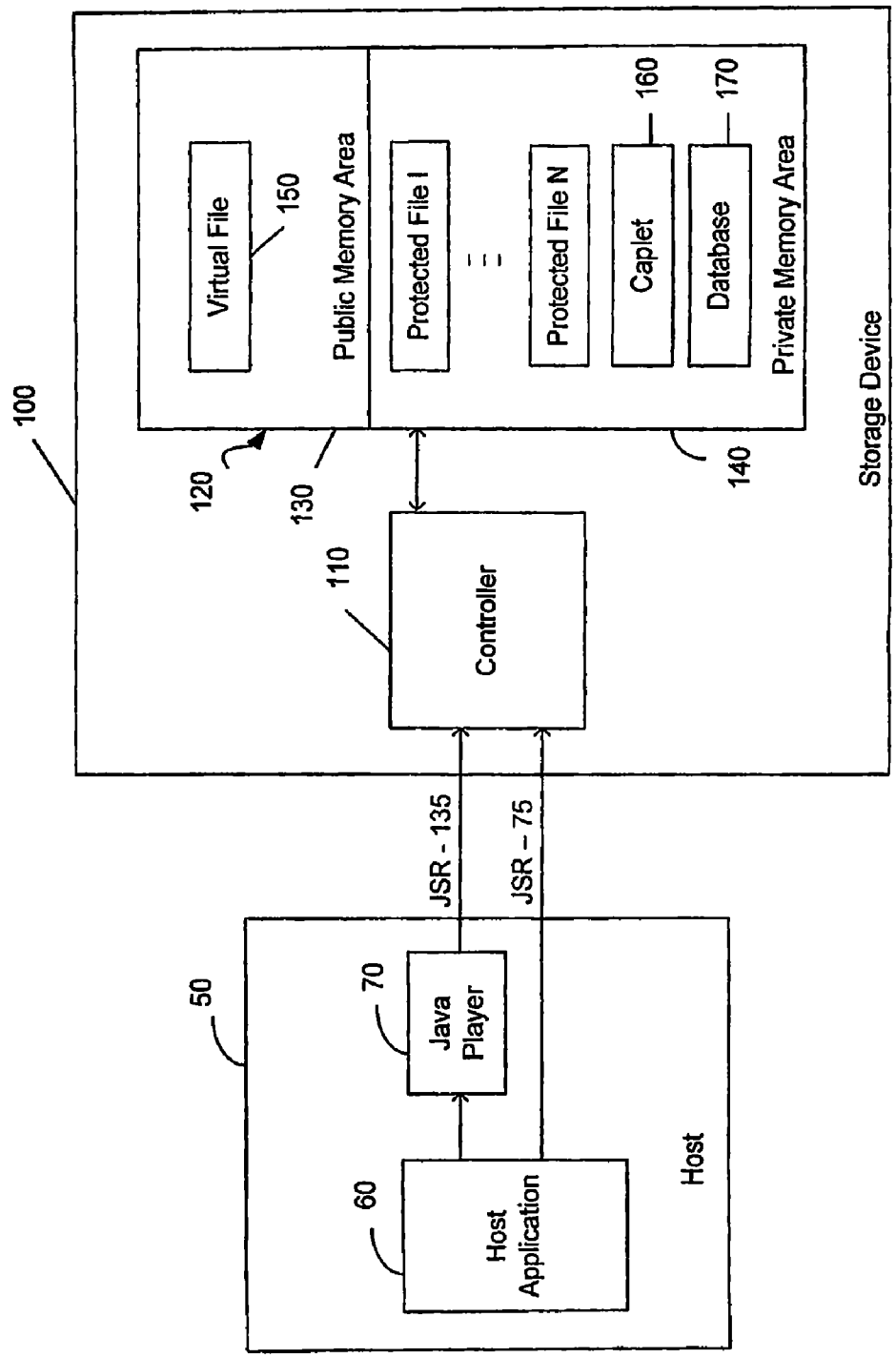
FIG. 2 is a block diagram of a host and a storage device of an embodiment.

Any suitable implementation can be used to allow the controller 110 to handle a host request for the virtual file 150. For example, in one embodiment shown in FIG. 2, an application (or caplet 160) stores a set of rules that determines the way the controller 110 manages the protected content in the private memory area 140 (e.g., what protected content to access and when). In this embodiment, the caplet 160 is stored in the private memory area 140 to prevent a hacker from tampering with the set of rules. The controller 110 uses the set of rules in the caplet 160 to determine how to react to a request from the host 50 to access the virtual file 150. The private memory area 140 also stores a database 170 that associates the plurality of protected files 1-N with the virtual file 150. In this way, the database 170 acts as a playlist of the plurality of protected files 1-N. In one embodiment, the database 170 is preloaded into the storage device 100 along with the plurality of protected files 1-N. If the database 170 is encrypted, the caplet 160 can hold the key to decrypt the database 170.

In operation, when the storage device 100 is powered-up, the caplet 160 programs the controller 110 to control access attempts made by the host 50 to the virtual file 150 according to the preloaded database 170. For example, in response to a request to access the virtual file 150, the controller 110 can select and provide access to one of the plurality for protected files 1-N based on the database 170. As another example, the controller 110 can determine whether the host 50 is authorized or unauthorized and can provide access to different types of content accordingly, which may be desirable if the storage device 100 is a portable memory card that can be used with a variety of hosts that may or may not be authorized. So, if the host 50 is an authorized player, the controller 110 can respond to the request from the host 50 to access the virtual file 150 by providing access to protected content. Otherwise, the controller 110 can respond to the host request by providing access to an alternate file. In this way, the set of rules can specify that the controller 110 should provide access to a protected file (e.g., a movie) if an application on the host 50 is authorized; otherwise, the controller 110 can provide access to an alternate file (e.g., a trailer for the movie), which may be stored in the public or private memory areas 130, 140. In this way, a similar host request to access the virtual file 150 can be handled differently by the controller 110 based on whether the host 50 is an authorized or unauthorized entity (e.g., the storage device 100 can return a dedicated commercial if the user has not logged-in or has not been authenticated by the storage device 100). Of course, this is just one example, and other types of rules and conditions can be used. For example, the selection of the file can be based on time, information about the user, whether and how the host logged into the storage device 50, or any other suitable condition. As seen from these examples, the virtual file 150 can be treated differently in different situations, and a single virtual file 150 in the public memory area 130 can be used to provide access to one or more protected files in the private memory area 140.

Returning now to FIG. 2, in this embodiment, the host 50 runs a host application 60 and a media player (here, a Java player 70). The host application 60 controls the Java player 70 and also sends additional instructions to the controller 110 of the storage device 100, which will be described below. As mentioned above, in this embodiment, a virtual file 150 (e.g., named "audio.MP3") is associated with the plurality of protected files 1-N stored in the private memory area 140. Every time the host 50 request access to "audio.MP3," the controller 110 can select and provide access to a different one of the plurality of protected files 1-N. In this embodiment, the size of the virtual file 150 is at least as large as the size of the largest protected file in the private memory area 140. If the selected protected content is smaller than the size of the virtual file 150, the controller 110 can pad the content with valid data, so that the Java player 70 in the host 50 does not malfunction. For example, if the protected file is an audio file, the controller 110 can, on the fly, pad the audio file with valid data, such as silent MP3 frames or expected header information. This is done to be able to support different host cache-ahead mechanisms. To prevent the controller 110 from playing the padded data, the controller 110 can inform the host 50 of the actual play length of the file, and the host 50 can stop the playback of the file before it reaches the padded data.

Consider an example in which the Java player 70 sends a request to the storage device 110 using the JSR-135 protocol to read the virtual file 150, which it thinks is an audio file. The controller 110 in the storage device 100 detects that an attempt is being made to access the virtual file 150 (e.g., from the logical block address specified in the request) and, based on the rule in the caplet 160, the controller 110 selects and provides the Java player 70 with access to Song A. The controller 100 also informs the host application 60 of the actual size of Song A, which may be less than the size of the virtual file 150, as discussed above. The host application 60 monitors the playback and when Song A is complete, the host application 60 sends a command to the controller 110 via the JSR-75 protocol to stop streaming data and to skip to the next song. (The JSR-135 protocol does not support this type of command.) In response to this command, the controller 110 updates the database 170 to point to the next song (Song B). The host application 60 instructs the Java player 70 to again request access to the virtual file 150. However, this time, the controller 110 selects and provides the Java player 70 with access to Song B (not Song A). The process described above then repeats as the Java player 70 continues to request playback of additional songs.

There are many alternatives that can be used with these embodiments. For example, in one embodiment, the storage device 100 uses a "dedicated file system" for playback of preloaded protected files to minimize the time it takes the storage device 100 to locate and access the preloaded protected files and to minimize the time it takes to extract details on the preloaded protected files (e.g., track name, artist name, album name, track duration, etc.). In this way, time to access the virtual file 150 should be about the same as the time to access another type of file, in spite of the controller 110 overhead involved in providing the gateway functionality to the protected files. To implement this dedicated file system, protected files can be preloaded into the private memory area 140 in continuous logical block address (LBA) order. Tables can then be built during production to specify the exact starting LBA for each protected file, along with any other relevant data, such as file duration. Because reading such tables is faster than opening files to gather needed information, the use of this dedicated file system provides a faster response time.

As understood from the above description, the "dedicated file system" can be used to reduce the amount of time that is required for locating and accessing different preloaded content. This can be done by defining a dedicated structure (e.g., a table) for saving, in a specific way, only the needed data for playback. This data can change between different products according to product-specific requirements (e.g., track name, artist name, album name, track duration, etc.). This data structure can be preloaded into a secure location in the storage device 100, in continuous LBA order, with the tables holding the data located in the exact starting LBA for each file alongside other data specified before. Every entry in the table can represent a specific file which can be identified using a entry key in the table. Upon a request to access a specific file, the file is located in the table, and the relevant data is retrieved. For example, playing a song from the beginning using the virtual file 150 may require knowledge of the starting LBA of the file, its actual duration, and the album name to be displayed. In this way of handling files, the required amount of time to locate and playback a file dramatically decreases as compared to the time needed to handle a FAT table and parse the file content.

As another alternative to provide a faster response time, the storage device 100 can support the use of a "compound command." A compound command is a single command that incorporates two or more commands that control different aspects of the playback system, such as, for example, changing both the virtual file state and the song that is being played. The use of compound commands may be especially desirable in environments, such as audio streaming, where a fast response time is desired. For example, a compound command can specify "skip channel" and "skip two songs ahead" or "skip song and go into pause." In many situations, several mode changes may need to occur at the same time. For example, the sequence of "playing a song, going into pause mode, then skipping to the next song" may require the next song to start instantly after the skip occur. In this case, two commands may need to be sent over the bus in order for this change to take place. In another example, different aspects of the system may need to be controlled at the same time, such as changing both the virtual file state and the song that is being played. Again, the idea is to reduce the amount of time needed for handling state changes on the storage device 100 and the amount of time it takes to transport the command from the host 50 to the storage device 100 and back.

In yet another alternative, instead of allocating actual memory in the public memory area 130 for the virtual file 150, memory consumption can be reduced by having the public memory area 130 emulate itself to the host 50 as an extended storage area, so that a host request to the extended (emulated) storage area is handled by the controller 110 as if it were a host request to the private memory area 140 of the storage device. As a result, the virtual file 150 does not consume real memory in the public memory area 130. This allows storing large files (e.g., movies) without consuming valuable memory. Consider, for example, the situation in which the virtual file 150 is 15 MB and the public memory area 130 is 30 MB. Using the technique described above, the storage device 100 can identify itself as having a 45 MB public memory area 130, in which 30 MB are mapped to physical addresses and 15 MB are not.

While the examples discussed above relate to reading a protected file out of the storage device, in an alternate embodiment, the virtual file 150 is used to add new content in the private memory area 140, if the host 50 is authorized to do so. For example, when a user buys a song, the host application 70 can control the private memory area 140 to add new content in its free space and then use the virtual file 150 to write the new song data to the private memory area 140. In another example, a stored commercial can be updated to a new commercial. This can be achieved by linking the virtual file 150 to this private file and then changing its content by writing to the virtual file 150. The storage device 100 can intercept the write command and channel the write operation to the correct place on the private memory area 140. This enables updating the private memory area 140 to hold updated content and purchased content in a secure way Additional alternatives relate to copy protection mechanisms. Because the virtual file 150 is accessible in the public memory area 130, the virtual file 150 can be easily copied by a simple copy command from any host. The following alternatives can be used to prevent copying of the virtual file 150, thereby assuring that access to protected content stored in the private memory area 140 is only given to an authenticated entity allowed to access the content. Otherwise, the host 50 can simply copy the virtual file 150 to another address range in the public memory area 130 and freely access the protected content.

One exemplary copy protection mechanism uses an encryption scheme to encrypt the protected content sent out of the storage device 100 by read operations of the virtual file 150. This can be done by using a session key that is updated each time an authentication process is applied between the host application 60 and the storage device 100 (e.g., during log in). This session key is known both to the host 50 and the storage device 100, so the storage device 100 can use the session key to encrypt the protected content, and the host 50 can use the session key to decrypt the protected content. The use of the session key in this way creates a secure channel between the storage device 100 and the host application 60.

Another exemplary copy protection mechanism uses a counter in the storage device 100 to count sectors that have been read by the host 50. When the counter reaches zero, the storage device 100 can start sending buffers of silent audio. The host 50, after proper authentication, can instruct the storage device 100, over playback time, to increase the counter. This operation of setting the counter can be done during the reading of the file (e.g., during playback of a song). In case an attempt to copy the file is made, the storage device 100 can detect the attempt and start returning invalid data to the host 50. This prevents copying of the song because a hacker can only retrieve a certain amount of the song (e.g., 1 MB of audio of a 5 MB song) without the counter being increased.

In yet another exemplary copy protection mechanism, a data rate control ("DRC") is enforced by the storage device 100 after examining a pattern of read operations from the host 50 to the virtual file 150. If these read operations do not occur as expected (e.g., the storage device 100 detects that copying of the virtual file 150 is taking place due to fast and rapid file access), the storage device 100 can return invalid data or fail the read process. In this way, the storage device 100 enforces data rate control on the protected file read from the storage device 100. The host 50 may be able to configure the storage device DRC mechanism to fit the specific traits of the current host 50 after having proper authentication to the storage device 100.

A "sliding window" can also be used as an exemplary copy protection scheme. With this mechanism, the storage device 100 allows the host 50 to read real data only within a specific LBA range. Accessing data outside this LBA range returns buffers of silent audio. The host 50 can reconfigure the allowed range, after proper authentication. Since the allowed range moves, it is referred to here as a "sliding window." The concept of the counter discussed above can be used as a sliding window (e.g., copy from 1 to 500 for now), or playback of data can be allowed from only a specific location inside the virtual file 150.

In yet another embodiment, the virtual file 150 can be used for playback from native media players. This can be done by using a relatively large virtual file for each playlist of content. This virtual file can be concatenate on-the-fly song-after-song. The storage device 100 can also provide an ID3 tag for each channel of content to be displayed in the host native player. In this way, the storage device 100 can be used on each host (e.g., handset) or operating system that is available. This solution can be enhanced by allowing the storage device a way to sense attempts to skip a song (e.g., by detecting when the user tries to fast-forward/rewind/drag the progress bar).

Exemplary Storage Device

As noted above, the storage device of these embodiments can be implemented in any suitable manner. The following paragraphs and referenced drawings describe one exemplary implementation. It should be understood that this implementation is merely an example and that details shown and described herein should not be read into the claims unless explicitly recited therein.

Figure 3A:
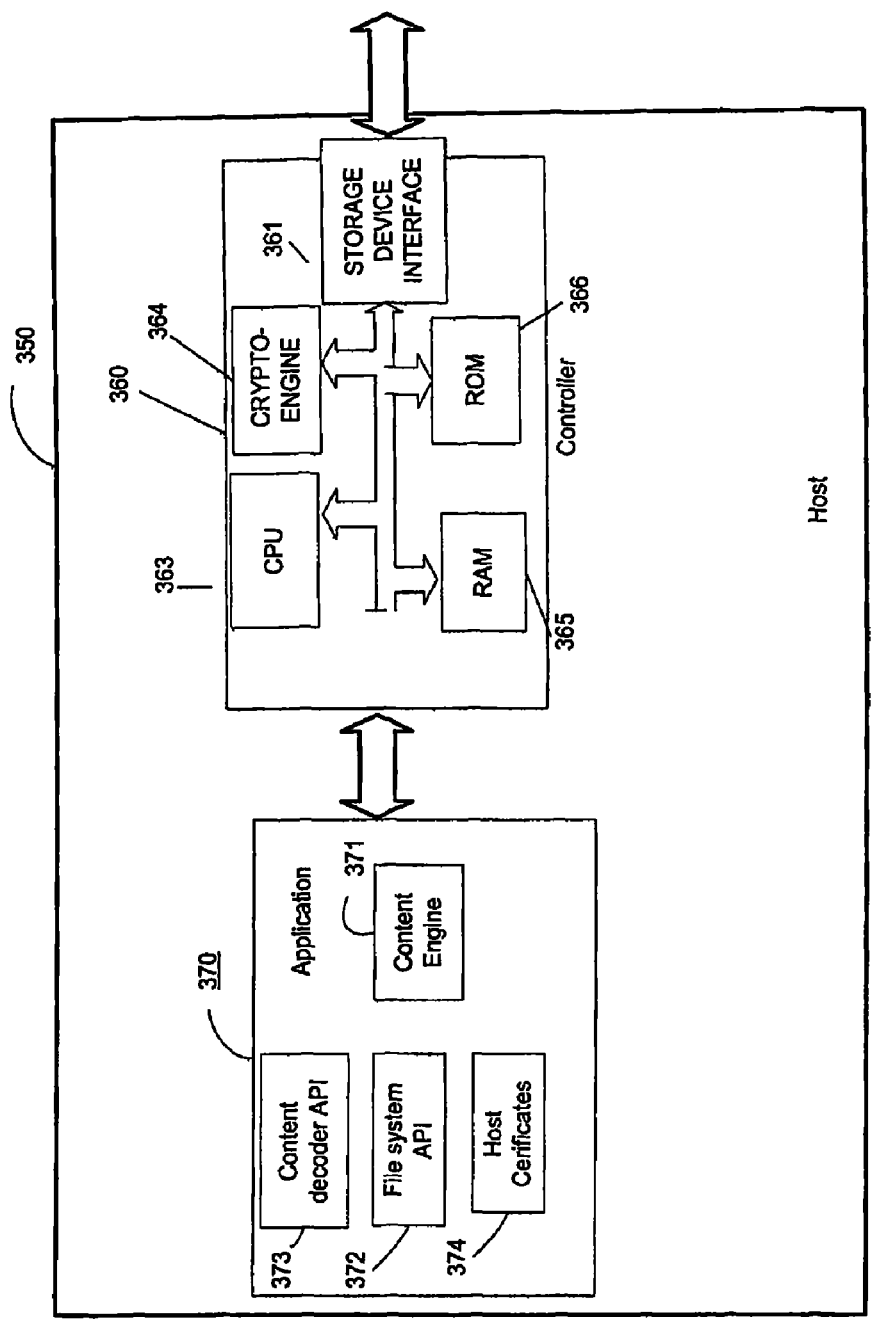
FIG. 3A is a block diagram of a host of an embodiment.
Figure 3B:
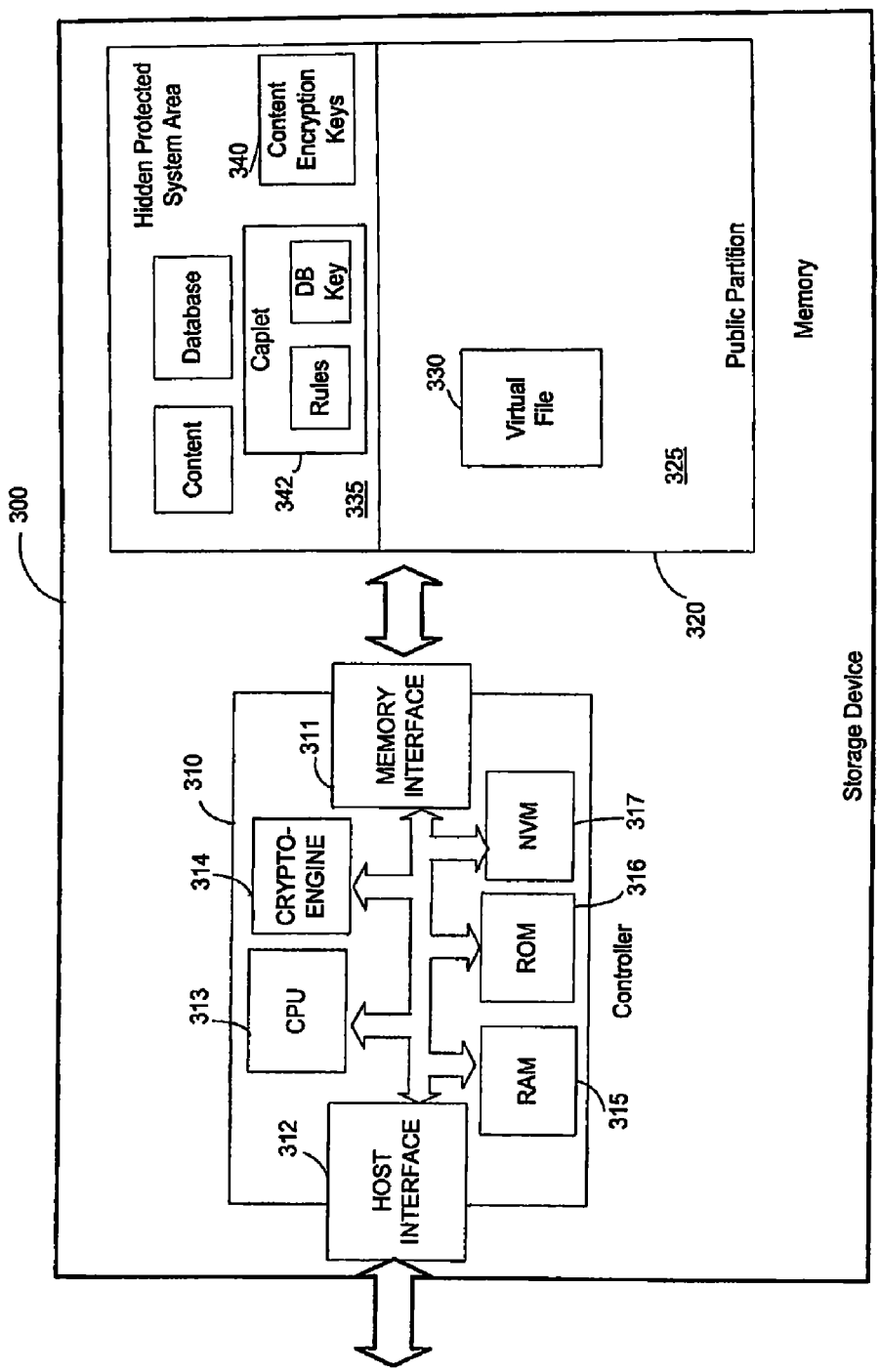
FIG. 3B is a block diagram of a storage device of an embodiment.

Returning to the drawings, FIGS. 3A and 3B are block diagrams of a storage device 300 and host 350 of an embodiment. Starting first with FIG. 3B, the storage device 300 comprises a controller 310 and a memory 320. The controller 310 comprises a memory interface 311 for interfacing with the memory 320 and a host interface 312 for interfacing with the host 350. The controller 310 also comprises a central processing unit (CPU) 313, a crypto-engine 314 operative to provide encryption and/or decryption operations, read access memory (RAM) 315, read only memory (ROM) 316 which stores firmware (logic) for the basic operations of the storage device 300, and a non-volatile memory (NVM) 317 which stores a device-specific key used for encryption/decryption operations. It should be noted that the storage device-specific key can be stored in other memory areas within the storage device. The components shown in FIG. 3B can be implemented in any suitable manner.

In this embodiment, the memory 320 comprises a public partition 325 that is managed by a file system on the host 350 and a hidden protected system area 335 that is internally managed by the controller 310. The hidden protected system area 335 stores content encryption keys (CEKs) 340, content, a database, and a caplet 342, as discussed above. The hidden protected system area 335 is "hidden" because it is internally managed by the controller 310 (and not by the host controller 360) and is "protected" because objects stored in that area 335 are encrypted with the unique key stored in the non-volatile memory 317 of the controller 310. (The storage device hardware unique key can be stored in the non-volatile memory 317 of the controller 310 or other areas within the storage device 300.) Accordingly, to access objects stored in that area 335, the controller 310 would use the crypto-engine 314 and the key stored in the non-volatile memory 317 to decrypt the encrypted objects. Preferably, the storage device 300 takes the form of a secure product from the family of products built on the TrustedFlash™ platform by SanDisk Corporation. The public partition 325 contains the virtual file 330.

Turning now to the host 350 in FIG. 3A, the host 350 comprises a controller 360 that has a storage device interface 361 for interfacing with the storage device 300. The controller 360 also comprises a central processing unit (CPU) 363, a crypto-engine 364 operative to provide encryption and/or decryption operations, read access memory (RAM) 365, and read only memory (ROM) 366. It should be noted that each component in box 360 can be implemented as separate chips in the overall host system. The host 350 also comprises an application 370 comprising a content engine 371, a file system API 372, a content decoder API 373, and host certificates 374.

The storage device 300 and the host 350 communicate with each other via the storage device interface 361 and the host interface 312. For operations that involve the secure transfer of data, it is preferred that the crypto-engines 314, 364 in the storage device 300 and host 350 be used to mutually authenticate each other and provide a key exchange. The mutual authentication process calls for the host 350 and storage device 300 to exchange unique certification IDs. After mutual authentication is complete, it is preferred that a session key be used to establish a secure channel for communication between the storage device 350 and host 300.

Embodiments Related to Bypassing the Host Device's Cache

Figure 4:
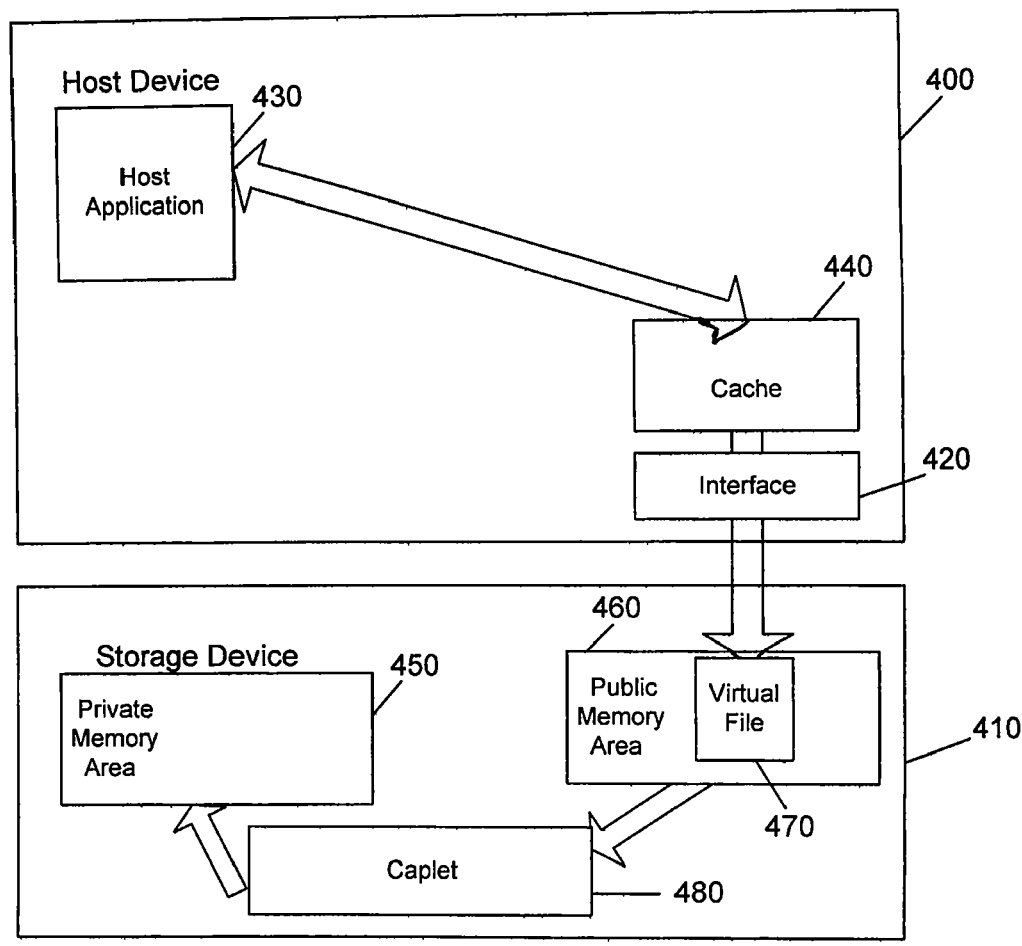
FIG. 4 is a block diagram of a host and a storage device of an embodiment illustrating a problem that can occur with a cache on the host.

Returning to the drawings, FIG. 4 is a block diagram of a host device 400 and storage device 410 of an embodiment. The host device 400 comprises an interface 420 configured to communicate with the storage device 410, a host application 430 (e.g., a media player), and a cache 440. The storage device 410 (e.g., an SD card) comprises an interface (not shown), a private memory area 450 storing content, a public memory area 460 storing a virtual file 470 associated with content stored in the private memory area 450, and a caplet 480. As discussed above, the virtual file 470 in the public memory area 460 provides access to secured content stored on the private memory array 450, and the caplet 480 enforces a set of predefined rules for accessing the secure data and streaming it out to the host device 400.

A problem can occur, however, when the host application 430 uses the cache 440 to attempt to improve performance when reading a file from the storage device 410. Specifically, if the host application 430 previously read the virtual file 470, the retrieved content would be stored in the host device's cache 440. When the host application 430 attempts to read the virtual file 470 again, instead of accessing the virtual file 470 on the storage device 410, the host application 430 will simply access the data stored in the cache 440, as the host application 430 assumes that the data is static. However, since a subsequent attempt to read the virtual file 470 should likely result in different content being read from the storage device 410, the use of the cache 440 in this situation will likely result in invalid or incorrect data being returned to the host application 430. For example, if the virtual file 470 were used to access multiple songs stored in the private memory area 450, the host application 430 would play the same song each time the virtual file is read, instead of playing different songs as desired.

Figure 5:
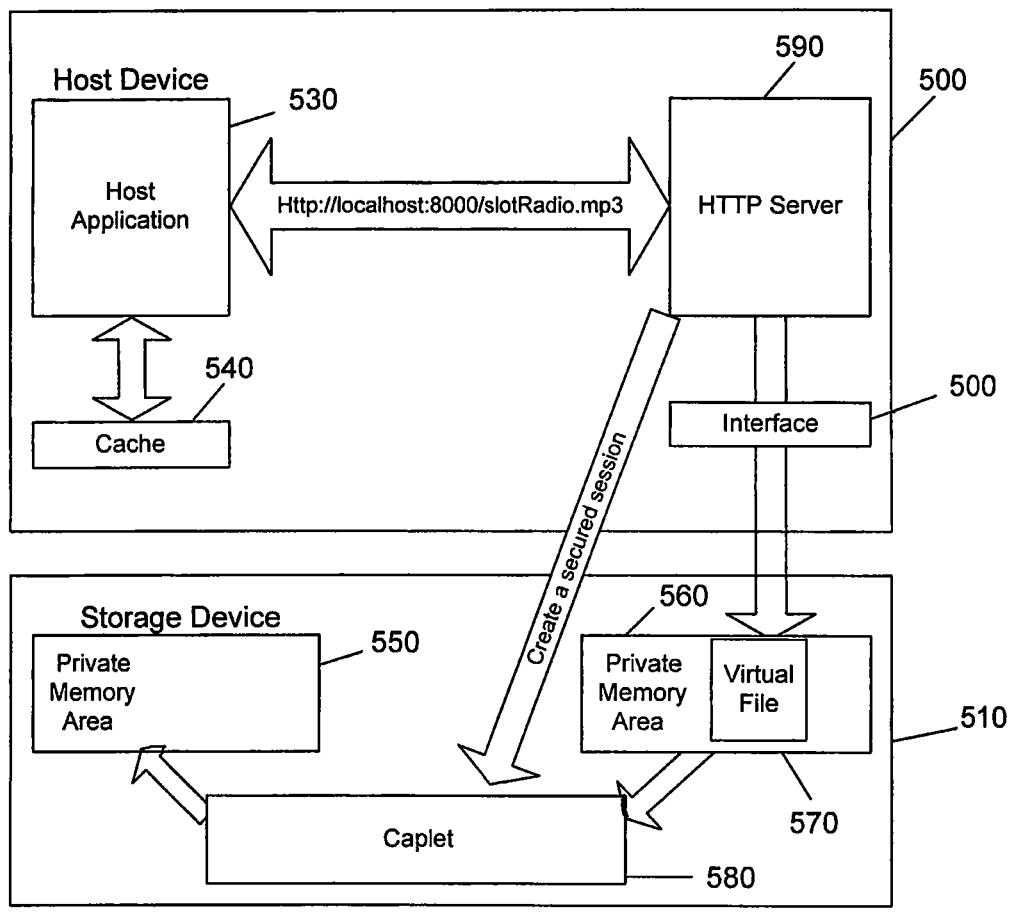
FIG. 5 is a block diagram of a host and a storage device of an embodiment in which a virtual file in a storage device is accessed by bypassing a cache in the host.

The host device 500 shown in FIG. 5 can be used to overcome this problem by preventing a file from being cached by the host device 500, thereby ensuring that data read from the virtual file is valid. Like the host device 400 in FIG. 4, the host device 500 in FIG. 5 also comprises an interface 520, a host application 530, and a cache 540. Likewise, the storage device 510 in this embodiment comprises a private memory area 550 storing content, a public memory area 560 storing a virtual file 570 associated with content stored in the private memory area 550, and a caplet 580. However, in this embodiment, the host device 500 also comprises a server 590. Although any type of server can be used, in this embodiment, the server 590 takes the form of a hypertext transfer protocol (HTTP) server. The server 590, which, in this embodiment, is integrated with the host application 530 and is executed on the host device 500, is responsible for managing the virtual file(s) stored on the storage device 500. In this embodiment, the server 590 runs as a thread on the host device 500 as an integral part of the host application 530 and is terminated when the host application 530 closes.

In general, the server 590 receives a request for the virtual file 570 from the host application 530, sends a request to the storage device 510 for the virtual file 570, receives the content associated with the virtual file 570 from the private memory area 550 of the storage device 510, generates a response to the request from the host application 530 that includes the content, and sends the response to the host application 530, while bypassing the cache 540. Because this server-client interaction bypasses the cache 540, this embodiment avoids the situation of incorrect content being read from the cache 540.

In a particular implementation using an HTTP server 590, for each virtual file stored in the public memory area 560 of the storage device 510, the HTTP server 590 hosts a specific URL (for example: http://localhost:8000/vfile.mp3). The file path in the URL is purely symbolic, and the server 590 holds a mapping from the file specified by the URL to a specific virtual file located on the public memory area 560 of the storage device 510. Accordingly, when the HTTP server 590 receives a URL of the virtual file from the host application 530, it translates the received URL to an address of the virtual file 570 in the public memory area 560 of the storage device 510. An access to a remote file on the server (an "HTTP Get" request) is equivalent to a read request for the virtual file 570 on the storage device 510.

Since the host device 500 knows that a requested remote file is stored remotely on the HTTP server 590 and not locally in the host device 500, the host device 500 does not cache the file's data. Accordingly, each access to the file requires reading the file's data from the HTTP server 590 by sending an "HTTP Get" request and parsing the HTTP response. This ensures that the storage device 510 must be accessed in order to read the data associated with the virtual file 570. The following is one exemplary flow, although any suitable process flow can be used. First, the host application 530 starts, and a dedicated thread is opened, which act as the HTTP server 590. The HTTP server thread creates a server socket and waits for incoming HTTP requests. When the host application 530 tries to read the content of the virtual file 570, it sends an "HTTP Get" request to the HTTP server 590, specifying the URL of the virtual file 570. The "HTTP Get" request is received by the HTTP server 590. The HTTP server 590 can validate the process that sent the request by checking its process ID or some other type of identifier. If the process ID does not have access permissions to read the content of the virtual file 570, the HTTP server 590 can return an error response. The HTTP 590 can then log-in to a dedicated access control record (here, the caplet 580) on the storage device 510 in order to open the virtual file 570 for reading. (In one preferred embodiment, the access control record is of the type used in a TrustedFlash™ storage device from SanDisk Corporation, although other types of access control records can be used.) Preferably, the access control record must be logged in to in order to receive the true content of the virtual file 570. In the case where the access control record is not logged in while reading the content of the virtual file 570, invalid data is preferably returned.

In order to bypass the host device's cache 540, the request sent to the storage device 510 for the virtual file 570 can comprise an indication to bypass the cache 540. In one embodiment, this indication comprises an O_DIRECT flag, which is a special flag that indicates that each read operation from the file will bypass the host device's cache 540 and will be directed to the storage device 510. When the HTTP server 590 opens the virtual file 570 by using the O_DIRECT flag, the HTTP server 590 would read the content of the virtual file 570 and generate an HTTP response, which includes the data from the private memory area 550 that is associated with the virtual file 570. The host application 530 then receives the response from the HTTP server 590 and parses the data of the virtual file 570. With this method, data read from the virtual file 570 will be the actual data of the file being stored on the storage device 510 instead of possibility incorrect data stored in the cache 540. This provides a simple and easy mechanism for bypassing the host caching mechanism and reading the data from the virtual file 570 while still monitoring access to the file 570.

There are several alternatives that can be used with these embodiments. For example, instead of using a server and command to bypass the host device's cache, the host can be programmed to read a large amount of data (i.e., larger than the data stored in the cache) when an attempt is made to read the virtual file. Because the read request is for more data than is stored in the cache, such a read request effectively invalidates the host cache and forces the host to acquire the data of the virtual file directly from the storage device. As another alternative, the above embodiments can be modified to directly work with existing commands (such as those used with TrustedFlash™ storage devices), so that the use of virtual file can be avoided. In this alternative, the HTTP server can get secured content from the private memory area of the storage device by creating a secured session with the storage device, creating a stream to the hidden partition, using read stream operations to extract encrypted content from the private memory area of the storage device, and decrypting the encrypted content.

While some of the above embodiments used a server in the host device to bypass the host device's cache, it should be noted that, more generally, the server in the host device can be used to bypass the dependency of playback on a specific file system call sequence on operating systems that do not allow user applications to include their own inputs into the playback engine. Specifically, the server can resolve an arbitrary universal resource identifier (URI) received from a host application into content that is otherwise unavailable to the host application. The server can then stream the content received from the storage device to the host application's playback engine, which may be operative only to perform network streaming and direct file access. (The data can be encoded (e.g., encrypted), in which case the server can transform (e.g., decrypt) that data during the streaming process.) In operation, a server (e.g., an HTTP server) receives a location of data (e.g., a URI) that is not directly accessible to the host application and then translates the locations into a translated location. The server then retrieves the data from the storage device (e.g., from a private partition in the storage device) using the translated address, and then provides the data to the host application.

Additionally, although not an exhaustive list, the following features can implemented in the server in any of the above embodiments:

1. Port randomization. The port that the server listens on can be random and change every time the stream changes, for example.
2. Calling process identifier check. The socket connection process identifier (PID) can be checked to insure that it (a) comes from the media server process and (b) has a user identifier (UID) that cannot come from an installable application.
3. Buffer progress matching. During playback, a buffer can be matched against the requests made from the HTTP server, wherein requests are not served if the buffer is full.
4. Uniform Resource Identifier (URI) randomization. The actual URI sent to the server in a request can be different at different times. In one embodiment, only the player application (or invoker of the server) and the actual playback engine has knowledge of the URI, and any other URI is considered an attack attempt. Also, the URIs can be derived using a pseudorandom one-time-password (OTP) algorithm, and a request made with the wrong URI can leave an open socket. Additionally, the URI can include a token that is negotiated using a challenge/response algorithm between the server and the calling application.

With regard to URI randomization, when the protected media content is to be streamed from an HTTP server, a host application can use a URI to identify the path to the content of interest and pass the URI to the underlying media player subsystems. As noted above, the URI, which identifies the server path and media file of interest, can be randomized and temporary. Preferably, the randomization of the URI is unique; ideally, never generated twice within the same host (e.g., handset). The URI is also preferably temporary and expires within some time frame (e.g., 30 seconds) of being issued. Once a URI has been accessed by a valid player, the HTTP server preferably shall not accept any other accesses to the URI.

An exemplary URI format can be as follows: video/hash/timestamp/mediaFileName, where (i) "video" is a constant string indicating access to video content, (ii) "hash" is a hash, such as, for example, MD5.hash(token+mediaFileName+timestamp), where token is unique per media file on the storage device, (iii) "timestamp" is a timestamp given as a hex string (e.g., the number of seconds since Jan. 1, 1970, 00:00:00 in hexadecimal notation), and (iv) "mediaFileName" is the name of the content file (e.g., a video file). Preferably, a randomized temporary URI is passed from the server via a native application interface (API).

In another alternative, a server (e.g., an HTTP server) in the host can be configured to transform (e.g., decode or decrypt) encoded (e.g., encrypted) files retrieved from the storage device (e.g., from the public partition of the storage device) and to return transformed data to a host application (e.g., in response to the "HTTP Get" request). This enables a host application (e.g., a media player) to play encoded files stored on the public partition of the storage device. Accordingly, unlike the embodiments discussed above of reading the content of a virtual file stored in the public partition of the storage device or sending specialized commands to extract content from a private partition of the storage device, the server in this alternative transforms dedicated files stored on the public partition of the storage device.

Conclusion

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

What is claimed is:

1. A host device comprising:
an interface configured to communicate with a storage device having a public memory area and a private memory area, wherein the public memory area stores a virtual file that is associated with content stored in the private memory area;
a cache;
a host application in communication with the cache; and
a server in communication with the host application and the interface, wherein the server is configured to:
receive a request for the virtual file from the host application,
send a request to the storage device for the virtual file, receive the content associated with the virtual file from the private memory area of the storage device, wherein the content is received by bypassing the cache, and generate a response to the request from the host application, the response including the content.

2. The host device of claim 1, wherein the server comprises a hypertext transfer protocol (HTTP) server.

3. The host device of claim 2, wherein the request received by the HTTP server comprises an HTTP Get request.

4. The host device of claim 2, wherein the HTTP server is further configured to:

receive a universal resource locator (URL) of the virtual file from the host application; and translate the URL received from the host application to an address of the virtual file in the public memory area of the storage device.

5. The host device of claim 1, wherein the request sent to the storage device for the virtual file comprises an indication to bypass the cache.

6. The host device of claim 5, wherein the indication to bypass the cache comprises an $O_{13}$ DIRECT flag.

7. The host device of claim 1, wherein the server is further configured to determine if the host application has permission to access the content.

8. The host device of claim 7, wherein the server is further configured to determine if the host application has permission based on an identifier received from the host application.

9. The host device of claim 1, wherein the server is further configured to log-in to an access control record on the storage device in order to open the virtual file.

10. The host device of claim 1, wherein the server is further configured to create a secured session with the storage device, create a stream to the private memory area, use read stream operations to extract encrypted content from the private memory area of the storage device, and decrypting the encrypted content.

11. A method for accessing a virtual file in a storage device by bypassing a cache in a host device, the method comprising:

performing the following in a server in host device, wherein the host device is in communication with a storage device having a public memory area and a private memory area, and wherein the public memory area stores a virtual file that is associated with content stored in the private memory area:

receiving a request for the virtual file from a host application in the host device;

sending a request to the storage device for the virtual file;

receiving the content associated with the virtual file from the private memory area of the storage device, wherein the content is received by bypassing a cache in the host device; and generating a response to the request from the host application, the response including the content.

12. The method of claim 11, wherein the server comprises a hypertext transfer protocol (HTTP) server.

13. The method of claim 12, wherein the request received by the HTTP server comprises an HTTP Get request.

14. The method of claim 12 further comprising:

receiving a universal resource locator (URL) of the virtual file from the host application; and translating the URL received from the host application to an address of the virtual file in the public memory area of the storage device.

15. The method of claim 11, wherein the request sent to the storage device for the virtual file comprises an indication to bypass the cache.

16. The method of claim 15, wherein the indication to bypass the cache comprises an O_DIRECT flag.

17. The method of claim 11 further comprising:

determining if the host application has permission to access the content.

18. The method of claim 17, wherein the server determines if the host application has permission based on an identifier received from the host application.

19. The method of claim 11 further comprising:

logging-in to an access control record on the storage device in order to open the virtual file.

20. The method of claim 11 further comprising:

creating a secured session with the storage device;

creating a stream to the private memory area;

using read stream operations to extract encrypted content from the private memory area of the storage device; and decrypting the encrypted content.

* * * * *